UNITED STATES PATENT OFFICE.

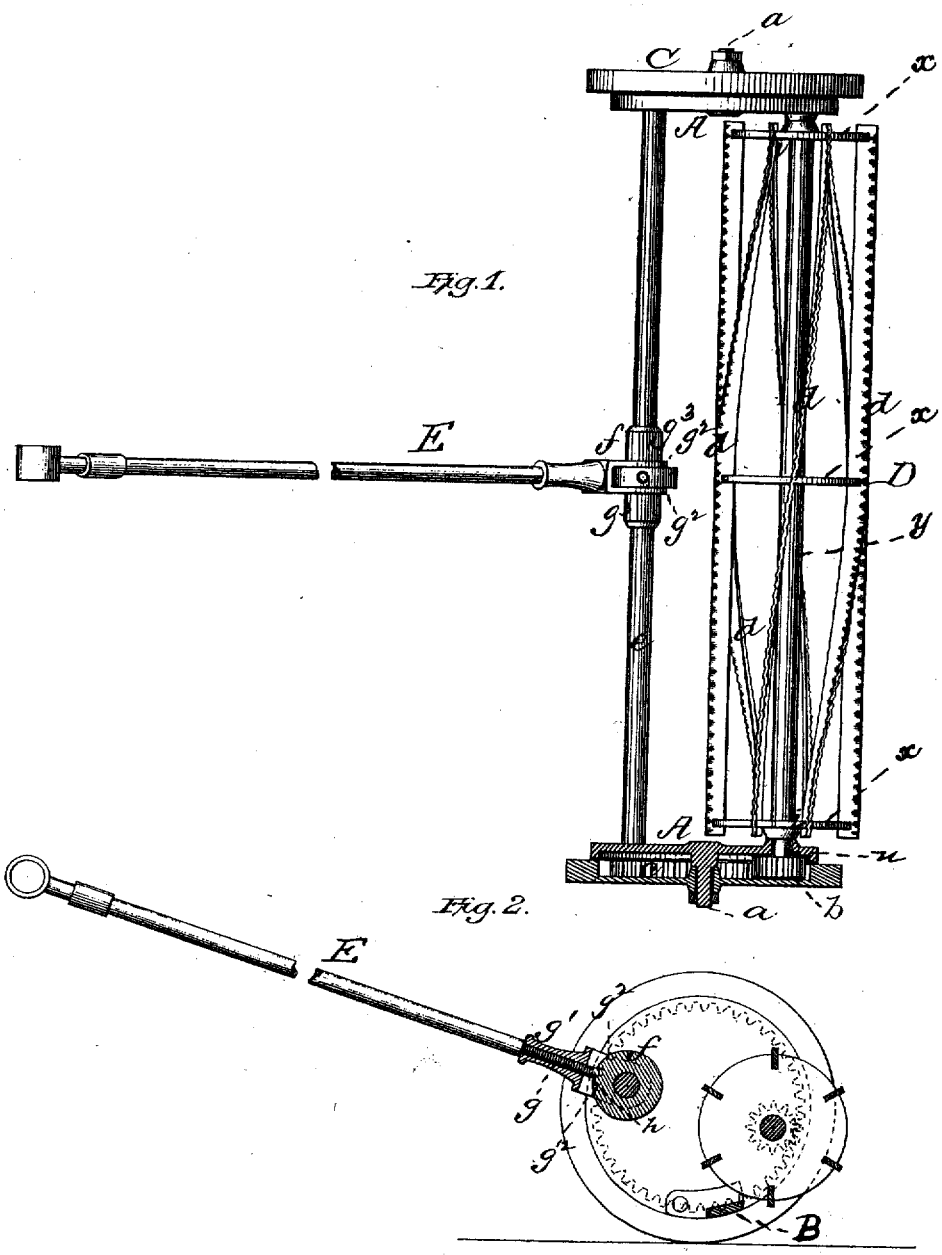

AARON J. WHITCOMB, OF ILION, NEW YORK.

IMPROVEMENT IN LAWN-MOWERS.

Specification forming part of Letters Patent No. 221,640, dated November 11, 1879; application filed April 26, 1879.

*To all whom it may concern:*

Be it known that I, AARON J. WHITCOMB, of Ilion, in the county of Herkimer and State of New York, have invented a new and valuable Improvement in Lawn-Mowers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of my improved mower, and Fig. 2 is a transverse section thereof.

This invention appertains to certain improvements in lawn-mowers which are exceedingly simple, cheap, and easily constructed; and it consists in certain novel combinations of devices used, whereby useful and desirable results are attained, substantially as hereinafter more fully set forth.

In the accompanying drawings, A A refer to two disks or heads, to and between the forward sides of which is attached the cutter-bar or knife B. The cutting-edge of this bar or knife may be serrated or corrugated, if desired. The disks or heads A A are provided with short axes $a$ $a$ to receive the wheels C C for transporting and propelling the machine.

D is the cutter, with its shaft $y$ hung in the disks or heads A A, and provided with pinions $b$ $b$, gearing with and driven by internal cogs $c$ $c$ on the wheels C C. The cutter D is provided with a series of transverse cutting-blades, $d$, having straight cutting-edges bent or corrugated in wave form, the corrugations having their concave and convex edges continuous and substantially in the same plane, to strengthen and aid them in the performance of their work.

Upon the shaft $y$ are secured at intervals the disks $x$, that are provided in their edges with, preferably, oblique kerfs $i$, so arranged relatively to each other that the blades $d$, secured therein, are spirally arranged relatively to the shaft $y$.

The cutter is so hung or arranged with relation to the cutter-bar or knife that its blades or wings will strike and hold the grass, &c., down as against the action of the cutter-bar or knife, to assist the latter while cutting the grass or mowing the lawn.

The disks or heads A A are connected together at their opposite sides by a rod or bar, $e$, fitted with a hub or disk, $f$, held thereon by a screw or otherwise from turning.

E is the handle, which, for lightness, may be made of tubing or pipe. The inner end of this handle is provided with a screw, $g$, which engages a screw-threaded socket, $g'$, formed on a bridge, $g^2$, spanning the ratchet-disk $f$, and rigidly secured to or forming a part of the hub $g^3$, loosely moving on shaft $e$, and arranged one at each side of the ratchet-disk $f$. The screw-threaded end $g$ of the handle E engages and extends through the socket into engagement with the ratchet-disk, and when thus engaged locks the hub $d^3$ to the ratchet-disk $f$.

By this construction, it will be observed that the handle can be adjusted or screwed in its socket, so as to cause its inner end to bear against and be firmly held in contact with the disk or hub $f$ on the rod or shaft $e$ at any desired angle to suit the height of the operator. The inner end of the handle may be slightly tapered and caused to enter any one of a number of shallow sockets or depressions, $h$, in the face of the disk $f$, to aid in holding the handle in contact with the disk.

This mower is characteristic for its simplicity, cheapness, and ease of construction, as well as for convenience in adapting it to the height of the operator and the thorough manner in which it performs its work.

To the under side of the machine may be hung or affixed a receptacle for receiving the cut grass.

Having thus fully described my invention, I claim and desire to secure by Letters Patent—

1. In a rotary mower, a transverse cutting-blade having a straight cutting-edge bent or corrugated in wave form, the corrugations having their convex and concave edges continuous and substantially in the same plane, as specified.

2. The combination, with a rotary lawn-mower frame having bar $e$, a ratchet-disk, $f$, fixed centrally thereon, and provided with spaced recesses in its perimeter, hubs $g^3$ at each side of the ratchet-disk and moving loosely on the bar $e$, a bridge, $g^2$, spanning the disk, secured to the hubs $g^3$, and provided with screw-threaded socket $g'$, and a handle, E, having a screw-threaded end, $g$, engaging the socket and adapted to engage the recesses of disks $f$, substantially as specified.

In testimony that I claim the above I have hereunto subscribed my name in the presence of two witnesses.

AARON JOSEPH WHITCOMB.

Witnesses:
P. M. YOULEN,
J. F. ROGERS.